United States Patent
Forsberg

(10) Patent No.: US 7,308,209 B2
(45) Date of Patent: Dec. 11, 2007

(54) TRANSMITTER CIRCUIT COMPRISING A LIGHT SOURCE AND A COMMUNICATION SYSTEM

(75) Inventor: Gunnar Forsberg, Stockholm (SE)

(73) Assignee: Transmode Systems AB, Stockholm (SE)

( * ) Notice: Subject to any disclaimer, the term of this patent is extended or adjusted under 35 U.S.C. 154(b) by 756 days.

(21) Appl. No.: 10/381,479

(22) PCT Filed: Sep. 18, 2001

(86) PCT No.: PCT/SE01/01990

§ 371 (c)(1),
(2), (4) Date: Mar. 26, 2003

(87) PCT Pub. No.: WO02/27980

PCT Pub. Date: Apr. 4, 2002

(65) Prior Publication Data

US 2004/0028313 A1 Feb. 12, 2004

(30) Foreign Application Priority Data

Sep. 29, 2000 (SE) .................................. 0003517

(51) Int. Cl.
*H04B 10/04* (2006.01)
(52) U.S. Cl. ................. 398/182; 398/192; 398/194
(58) Field of Classification Search .............. 398/141, 398/182, 192, 194
See application file for complete search history.

(56) References Cited

U.S. PATENT DOCUMENTS 4,054,910 A * 10/1977 Chou et al. ................ 725/78
4,481,676 A * 11/1984 Eumurian et al. .......... 398/136

FOREIGN PATENT DOCUMENTS

| EP | 0542480 | 5/1993 |
| FR | 2677183 | 12/1992 |
| GB | 2234408 | 1/1991 |

\* cited by examiner

*Primary Examiner*—Dalzid Singh
(74) *Attorney, Agent, or Firm*—Bingham McCutchen LLP

(57) ABSTRACT

The invention concerns a transmitter circuit comprising a light source (20) and arranged to operate said light source (20) to transmit optical communication signals in response to balanced electric input signals from a first (11) and a second (12) circuit point. The transmitter circuit comprises a first (21) and a second (22) circuit branch which extend from said first (11) and second (12) points, respectively. The light source (20) is connected between the circuit branches (21, 22). The components which are positioned on the circuit branches (21, 22) are selected such that the transmitter circuit is formed with a symmetry which is such that, under normal operation conditions, a balanced drive voltage is the case between the connection points (13, 15) of the light source (20) on the circuit branches (21, 22) and such that the modulation current which drives the light source (20) essentially only depends on the voltage difference between said connection points (13, 15). The invention also concerns a communication system which comprises such a transmitter circuit.

13 Claims, 3 Drawing Sheets

TRANSMITTER CIRCUIT COMPRISING A LIGHT SOURCE AND A COMMUNICATION SYSTEM

BACKGROUND OF THE INVENTION AND PRIOR ART

The present invention concerns a transmitter circuit comprising a light source and arranged to operate said light source to transmit optical communication signals in response to electric input signals from a first and a second circuit point between which circuit points a balanced electric input signal is intended to be present. The invention also concerns a communication system comprising such a transmitter circuit.

Different transmitter circuits of the above mentioned kind are known. Such transmitter circuits are often used within telecommunication systems and data communication systems for transmitting optical signals in response to electric signals. The optical signals are usually transmitted in one or more optical fibres. The electric input signal is usually present as a balanced signal on a pair of electric conductors, for example on a twisted pair. Such a pair of electric conductors has a certain characteristic impedance, for example 100 ohm. In order to avoid undesired reflections, such a pair of electric conductors should in its end point be connected to a load which corresponds to the characteristic impedance.

It should be noted that by a balanced signal is meant that the signal that is present on the pair of conductors is such that the voltages on corresponding points on the two conductors are of the same magnitude but have opposite polarity relative to a reference potential. This reference potential is usually earth potential. With an unbalanced signal (or "single-ended") is meant that the signal, i.e. the voltage variation, is only present on one conductor, while the other conductor, or the reference potential, is at a constant potential, usually on earth potential.

On a pair of conductors with a balanced signal, due to noise or other phenomena, a signal which is superposed on the two conductors may occur, a so-called common mode signal, which signal may vary with time. This signal is often undesired and should therefore be suppressed. This is often done with the help of, for example, transformers, baluns (a balun is a device which converts a balanced signal to an unbalanced signal) and differential amplifiers.

Also when a balanced electric signal is to be converted to an optical signal, such an undesired superposed signal need to be suppressed in order for the light source, which transmits the optical signal, to be correctly operated. According to the prior art, this has usually been done by first converting the balanced electric signal to an unbalanced electric signal.

FIG. 1 shows an example of the prior art. The electric balanced input signal is here present on a twisted pair 30. The balanced signal is converted to an unbalanced signal with the help of a balun 41 and a transformer 42. The circuit also comprises a termination resistance 43 which is adapted to the characteristic impedance of the twisted pair 30. Thereafter follows one or more circuits 44, which i.a. produce a suitable bias current and a modulation current, wherein the total current drives the light source 20.

Also EP-A-0 542 480 shows an example of a transmitter circuit. The transmitter circuit comprises two differentiators and an amplifier for driving a light emitting diode.

The prior known solutions are relative complicated and expensive, since they often comprise relatively complicated and expensive components, such as active components or transformers. Furthermore, known transmitter circuits often have a relatively high current consumption.

It should be noted that by active components is meant components which produce a gain or a switching, for example transistors, integrated circuits, and diodes.

SUMMARY OF THE INVENTION

An object of the present invention is to achieve a transmitter circuit which is more simple than typical known transmitter circuits. A further object is that the transmitter circuit should have a high functional reliability and that it should be inexpensive to produce.

These objects are achieved according to the invention with a transmitter circuit of the kind which has been described in the first paragraph above and which comprises a first circuit branch which extends from said first point via a third point to at least a fourth point, and wherein said transmitter circuit comprises a second circuit branch which extends from said second point via a fifth point to at least a sixth point, wherein said light source is connected between said third and fifth points, wherein the components which are positioned on said first and second circuit branches are chosen such that the transmitter circuit is formed with a symmetry which is such that under normal operation conditions a balanced drive voltage is the case between said third and fifth points, which balanced drive voltage only depends on the voltage difference between said first and second points, wherein also the modulation current through the light source only depends on said voltage difference.

With the invention, the advantage is achieved that the balanced signal does not need to be converted to an unbalanced signal. The circuit according to the invention can thereby be realised with simple and inexpensive components.

It should be noted that by "normal operation conditions" is meant that the transmitter circuit works within voltages and currents which are normal for the transmitter circuit, where, as has been mentioned, also an undesired superposed voltage may be present on the balanced electric signal. However, for example extreme voltage peaks may be considered to constitute non-normal operation conditions.

According to a preferred embodiment of the invention, said first and second circuit branches are formed with a mirrored symmetry, such that the electric properties of the components which are arranged on said first circuit branch correspond to the same electric properties of the components which are arranged on said second circuit branch.

This mirrored symmetry may preferably be achieved if the first and the second circuit branches comprise components with exactly the same value on corresponding positions in the respective circuit branch. The feature that the electric properties of the components correspond to each other means however that it does not have to be exactly the components on the two circuit branches, as long as the electric properties of the two circuit branches are the same. For example, the electric properties which together are the case in the component or components which are arranged between two nodes in one of the circuit branches ought to correspond to the same electric properties which together are the case in the component or components which are arranged between the corresponding two nodes in the second circuit branch.

Since the transmitter circuit is formed with this symmetry, it is possible to, with simple components, maintain a balanced signal all the way to the light source. Furthermore, it is achieved that the light source is only modulated by the voltage difference between the above mentioned first and second circuit points. The current through the light source is thus independent of a possible common-mode signal which is present on said first and second circuit points.

According to a further embodiment of the invention, the transmitter circuit is arranged such that a first constant voltage is the case at said fourth point and a second constant voltage is the case at said sixth point. Hereby, a suitable bias-current through the light source may be obtained in a simple manner.

According to a further embodiment of the invention, the transmitter circuit is arranged such that at least one of said first and second constant voltages is adjustable. Hereby, the bias-current may simply be adjusted without influencing the modulation current.

According to another embodiment of the invention, the transmitter circuit comprises a first capacitor arranged on said first circuit branch between said first and third points and a second capacitor arranged on said second circuit branch between said second and fifth points, wherein said first and second capacitors have essentially the same value. Through these capacitors it is in a simple manner prevented that a direct current, caused by the voltage difference between said fourth point and said sixth point, is conducted past the light source. Hereby, the bias-current through the light source may be determined in a simple manner. Furthermore, energy is saved since no direct current is conducted past the light source.

According to a further embodiment of the invention, the transmitter circuit comprises a first resistance on said first circuit branch between said first and third points and a second resistance arranged on said second circuit branch between said second and fifth points, wherein said first and second resistances have essentially the same value. With the help of these resistances, the relationship between the voltage of the balanced input signal and the modulation current through the light source can be adjusted such that a suitable modulation of the light source is achieved.

According to still another embodiment of the invention, the transmitter circuit comprises a third resistance arranged on said first circuit branch between said third and fourth points and a fourth resistance arranged on said second circuit branch between said fifth and sixth points, wherein said third and fourth resistances have essentially the same value. With the help of these resistances, the voltage over the light source is adjusted such that a suitable bias-current through the light source is obtained.

According to a further embodiment of the invention, all components which are arranged on said first and second circuit branches are passive components. Hereby, the advantages of the invention are achieved in a simple manner and with inexpensive components. Preferably, no transformers or magnetic components are used in the transmitter circuit. As has been mentioned above, also no balun is used.

According to another embodiment of the invention, the transmitter circuit comprises a third circuit branch which extends between a point on said first circuit branch and the corresponding point on said second branch, wherein the third circuit branch comprises at least a fifth resistance which is arranged to function as a termination resistance. The impedance of the circuit may thereby be adjusted to the characteristic impedance of a pair of conductors which pair conducts the balanced electric signal to said first and second points.

According to a further embodiment of the invention, said third circuit branch comprises a fifth and a sixth resistance which have essentially the same value and which are arranged to together function as a termination resistance, wherein the transmitter circuit is arranged such that a third constant voltage is the case between said fifth and sixth resistances on said third circuit branch. Hereby, a so-called common-mode termination is achieved, which means that possible signals which are superposed on both the first and the second circuit points are terminated, which reduces the occurrence of reflections and other disturbing phenomena.

According to another embodiment of the invention, the transmitter circuit comprises transient protection connected to said first and second circuit branches and arranged to protect the light source against undesired voltage pulses. The circuit is hereby protected against, for example, electrostatic discharges.

According to a further embodiment of the invention, the transmitter circuit comprises a third capacitor arranged on said first circuit branch between said first point and said first capacitor and a fourth capacitor which has essentially the same value as the third capacitor and which is arranged on said second circuit branch between said second point and said second capacitor, wherein said third circuit branch extends between a point on said first circuit branch positioned between said first and third capacitors and a point on said second circuit branch positioned between said second and fourth capacitors. With the help of these third and fourth capacitors, the input signal is AC-coupled. This, together with the above mentioned third constant voltage and the fifth and sixth resistances, means that the input signal may be adjusted to end up within an interval, in which the transient protection works well.

As has been mentioned above, a further object of the invention is to achieve an advantageous communication system. This purpose is achieved with a communication system which comprises at least a pair of electric conductors arranged to conduct a balanced electric signal, an optical conductor arranged to conduct said signal in optical form, a transmitter circuit according to any of the preceding embodiments and a receiver unit, wherein said pair of electric conductors is connected to said first and second points, said optical conductor is arranged to receive and conduct on light from said light source and said receiver unit is arranged to receive said light from the optical conductor. The communication system may, of course, also comprise another transmitter circuit and another receiver unit arranged to make a bi-directional communication possible in the communication system.

DESCRIPTION OF EMBODIMENTS OF THE INVENTION

Figure 1:
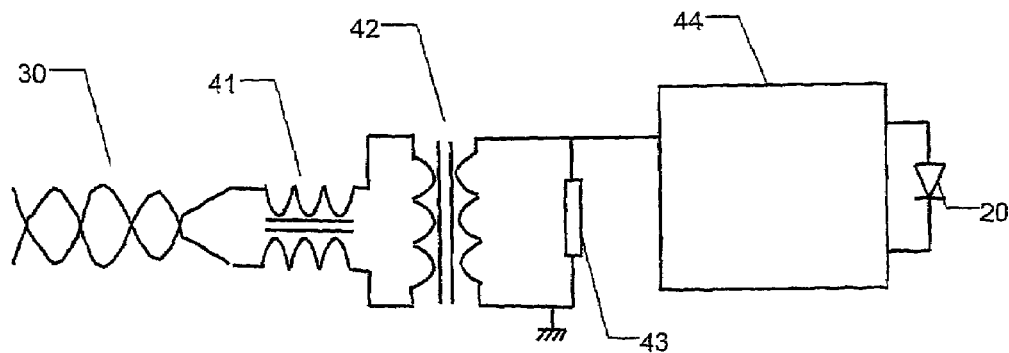
FIG. 1 shows a transmitter circuit according to the prior art.
Figure 2:
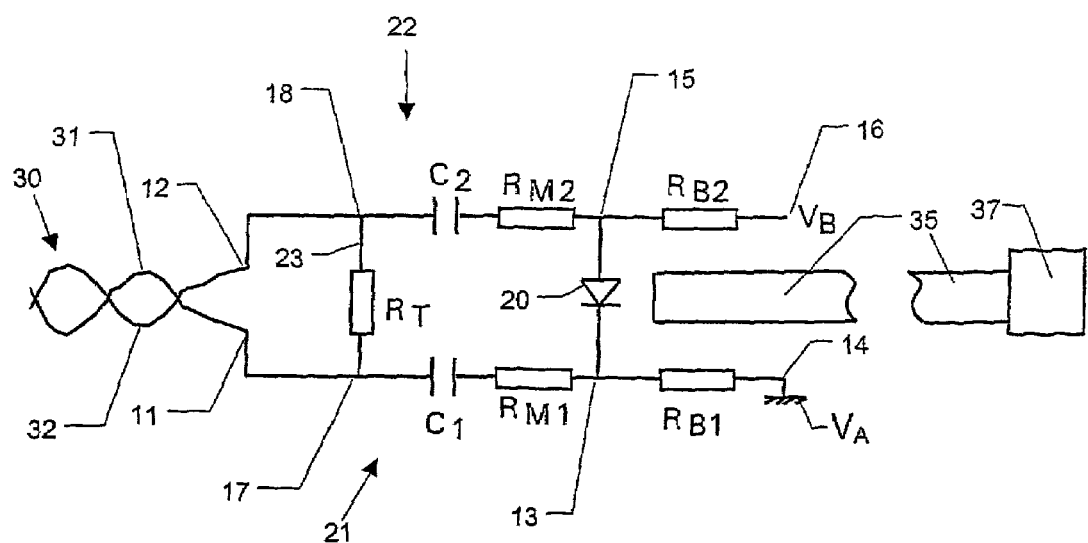
FIG. 2 shows a transmitter circuit and schematically a communication system according to an embodiment of the invention.

FIG. 2 shows a transmitter circuit and a communication system according to the invention. In the shown example, the communication system comprises a twisted pair 30 of conductors 31, 32. These conductors are connected to a first 11 and a second 12 point of the transmitter circuit. It should be noted that other kinds of conductors than a twisted pair 30 are possible. For example, a ribbon table is thus conceivable or simply two conductors on a circuit card. A balanced electric input signal is conducted to the first 11 and second 12 points. The transmitter circuit converts this signal to an optical signal which is transmitted from a light source 20. The communication system comprises a receiver unit 37 and an optical conductor 35 which conducts light from the light source 20 to the receiver unit 37.

The transmitter circuit has a first circuit branch 21 and a second circuit branch 22. The first circuit branch 21 extends from the first point 11 via a third point 13 to a fourth point 14. The second circuit branch 22 extends from the second point 12 via a fifth point 15 to a sixth point 16. The light source is connected between the third point 13 and the fifth point 15. The first circuit branch 21 comprises a first capacitor $C_1$ and a first resistance $R_{M1}$ which are connected in series after each other between the first point 11 and the third point 13. In a corresponding manner, the second circuit branch 22 comprises a second capacitor $C_2$ and a second resistance $R_{M2}$ which are connected in series between this second point 12 and the fifth point 15.

Furthermore, the first circuit branch 21 comprises a third resistance $R_{B1}$ which is arranged between the third point 13 and fourth point 14. The fourth point 14 is arranged to be at a first constant voltage $V_A$. In the shown example, this first voltage $V_A$ is earth potential. Furthermore, the second branch 22 comprises a fourth resistance $R_{B2}$ which is arranged between the fifth point 15 and the sixth point 16. The transmitter circuit is arranged such that a second constant voltage $V_B$ is the case at the sixth point 16. One of said first $V_A$ and second $V_B$ constant voltages may suitably be adjustable. For example, the second constant voltage $V_B$ may be adjustable. Thereby, the bias-voltage through the light source 20 may be simply adjusted without influencing the modulation current.

The transmitter circuit also comprises a third circuit branch 23. This third circuit branch 23 extends from a point 17 on the first circuit branch 21 to a point 18 on the second circuit branch 22. On the third circuit branch 23, a termination resistance $R_T$ is arranged. By a suitable choice of this termination resistance $R_T$, the impedance of the circuit may be adapted to the characteristic impedance of the conduction pair 30 which is connected to the transmitter circuit. The components which are positioned on the first 21 and second 22 circuit branches are chosen such that the transmitter circuit is formed with a symmetry. The symmetry is such that a balanced drive voltage is the case between the third 13 and the fifth 15 points. The balanced drive voltage is independent of a possible superposed voltage which is present on the input signal, i.e. on the two first 11 and second 12 points. In this manner, the light source 20 is modulated exactly in response to the voltage difference between the two conductors 31, 32 which are connected to the first 11 and second 12 points, respectively.

The easiest manner of achieving said symmetry is that the electric properties of the components which are arranged between different nodes on the first circuit branch 21 correspond to the same electric properties of the components which are arranged in corresponding positions in the second circuit branch 22. This purpose may simply be achieved if the first capacitor $C_1$ has the same value as the second capacitor $C_2$, the first resistance $R_{M1}$ has the same value as the second resistance $R_{M2}$, and the third resistance $R_{B1}$ has the same value as the fourth resistance $R_{B2}$.

An advantage with the invention is that all components which are arranged on the respective circuit branch 21, 22 between the first 11 and the fourth point 14 and between the second 12 and the sixth point 16, respectively, may be passive components. In the shown case, these components consist only of capacitors and resistances. Hereby, also the use of transformers or more expensive magnetic components is avoided.

A suitable bias-current through the light source 20 is selected by the choice of the second constant voltage $V_B$, the third resistance $R_{B1}$, and the fourth resistance $R_{B2}$. The scaling factor between the voltage of the balanced input signal and the modulation current through the light source 20 is selected by a suitable choice of the first resistance $R_{M1}$ and the second resistance $R_{M2}$. The first $C_1$ and the second $C_2$ capacitors prevent a superposed voltage from reaching the light source 20 in the form of a direct current.

Figure 3:
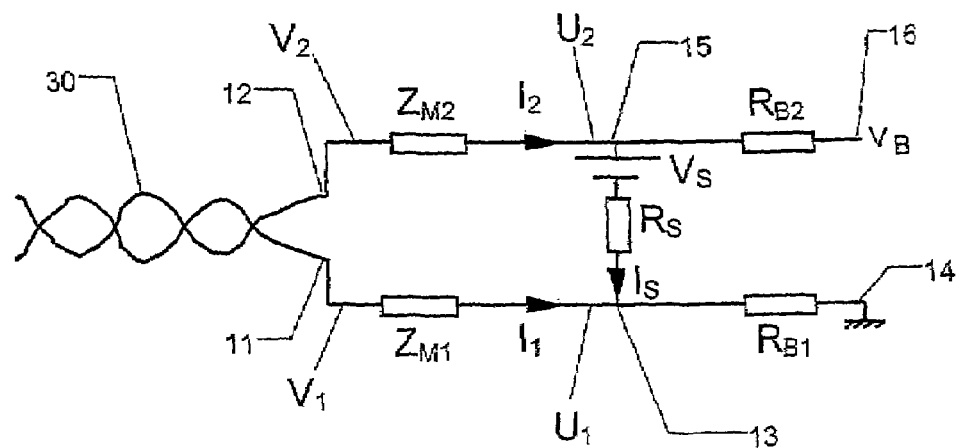
FIG. 3 shows an equivalent circuit of the transmitter circuit according to FIG. 2.

In order to show that the current through the light source 20 is independent of a possible superposed voltage on the conduction pair 31, 32, reference is made to FIG. 3. FIG. 3 shows an equivalent circuit of the transmitter circuit according to FIG. 2. As a light source 20, for example a light emitting diode or a laser diode may be used. A simple model of such a light source 20 is an independent voltage source $V_S$ in series with a resistance $R_S$. $Z_{M1}$ corresponds to the first capacitor $C_1$ in series with the first resistance $R_{M1}$. In a corresponding manner, $Z_{M2}$ corresponds to the second capacitor $C_2$ in series with the second resistance $R_{M2}$. In FIG. 2 also the currents $I_1$, $I_2$, and $I_S$ as well as the voltages $V_1$, $V_2$, $U_1$, and $U_2$ are marked.

With reference to FIG. 3 the following equations may be formed.

$$I_1 = \frac{V_1 - U_1}{Z_{M1}} \qquad (1)$$

$$U_2 = U_1 + V_S + I_S \cdot R_S \qquad (2)$$

$$I_2 = \frac{V_2 - U_2}{Z_{M2}} \qquad (3)$$

$$I_S = \frac{V_B - U_2}{R_{B2}} + I_2 \qquad (4)$$

$$I_S = \frac{U_1}{R_{B1}} - I_1 \qquad (5)$$

Since the transmitter circuit is symmetrically formed, also the following equalities are fulfilled.

$$R_B = R_{B1} = R_{B2} \qquad (6)$$

$$Z_M = Z_{M1} = Z_{M2} \qquad (7)$$

With the help of (1) to (7), the following expression may be derived.

$$I_S = \frac{(V_2 - V_1)R_B - V_S(R_B + Z_M) + V_B Z_M}{R_B(2Z_M + R_S) + Z_M R_S} \qquad (8)$$

From (8) is clear that the current through the light source only depends on the difference between $V_2$ and $V_1$. If, for example, both $V_2$ and $V_1$ suddenly increase, for example with 100 V, the current through the light source is not influenced.

In order to determine the bias-current, $V_2$ and $V_1$ may be set to be equal ($V_2 = V_1$). Thereby, the following is derived.

$$I_{SB} = \frac{V_S(R_B + Z_M) + V_B Z_M}{R_B(2Z_M + R_S) + Z_M R_S} \quad (9)$$

If it is assumed that $Z_M$ is a resistance in series with a capacitor, as in FIG. 2, then $Z_M$ goes towards infinity at the frequency 0 Hz. Thereby, the following is obtained when $Z_M$ goes towards infinity.

$$I_{SB} = \frac{V_B - V_S}{2R_B + R_S} \quad (10)$$

The expression (10) thus shows the direct current (the bias-current) through the light source. The modulation current is the total current (8) minus the bias-current (9). The modulation current is thus:

$$I_{SM} = \frac{(V_2 - V_1)R_B}{R_B(2Z_M + R_S) + Z_M R_S} \quad (11)$$

In order to take a numerical example, it may for example be assumed that the light source is a laser with $V_S$=1.6 V and $R_S$=30 ohm. Furthermore, it may for example be assumed that $V_B$=+5 V. If, for example, a bias-current of 8 mA is desired, then the following is obtained with the help of (10).

$R_B$=197.5 ohm

If it is assumed that the modulation current should be 1 mA at 1 V difference between $V_1$ and $V_2$, and if it is assumed that the capacitors can be seen as short-circuited at the modulation frequency, then $R_M$ is obtained to the following with the help of (11).

$R_M$=450.8 ohm

It remains to determine $R_T$ such that the total impedance matches the balanced input impedance of the conductor pair. Without $R_T$ it is the case at higher frequencies ($Z_M$=$R_M$), that the input impedance is the following.

$$R_{IN} = 2R_M + \frac{2R_B R_S}{2R_B + R_S} \quad (12)$$

If the obtained numerical values are inserted, then the following is obtained.

$R_{IN}$=929.6 ohm

If, for example, a total input impedance of 100 ohm is desired, then $R_T$ gets the value 112.1 ohm.

From the above described example, it is clear that the invention works as it is intended to work and that the circuit can be dimensioned in a simple manner.

Figure 4:
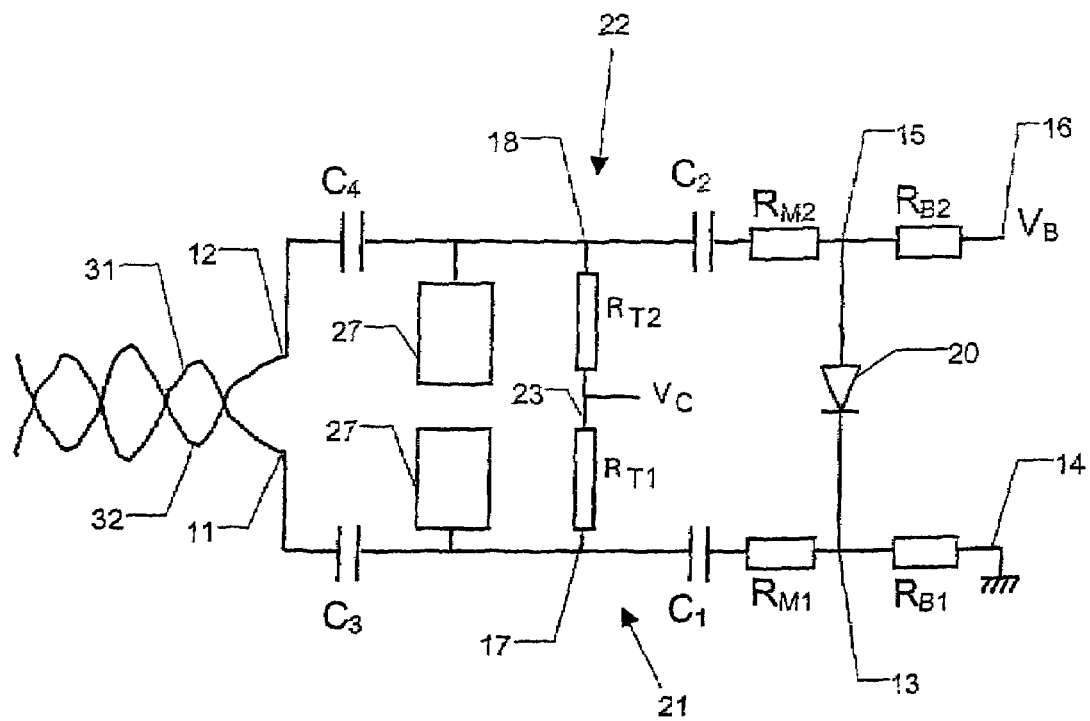
FIG. 4 shows a transmitter circuit according to another embodiment of the invention.

FIG. 4 shows another embodiment of the invention. The transmitter circuit according to FIG. 4 differs from the transmitter circuit according to FIG. 2 in that the third circuit branch 23 comprises a fifth resistance $R_{T1}$ and a sixth resistance $R_{T2}$. These resistances have essentially the same value. Furthermore, the third circuit branch 23 is arranged with a third constant voltage $V_C$ between said fifth $R_{T1}$ and sixth $R_{T2}$ resistances. Furthermore, the transmitter circuit comprises a transient protection 27 arranged to protect the light source 20 against undesired voltage pulses. Furthermore, the first circuit branch 21 of the transmitter circuit comprises a third capacitor $C_3$. The second circuit branch 22 comprises a fourth capacitor $C_4$. In order to achieve a suitable symmetry, suitably the third capacitor $C_3$ has the same value as the fourth capacitor $C_4$.

The transient protection 27 may be realised in different manners known to the person skilled in the art. For example, diodes or zener diodes may be used in order to limit the voltage if it ends up outside a certain interval. With the help of the third capacitor $C_3$ and the fourth capacitor $C_4$, the signal has been AC-coupled before it reaches the transient protection 27. With the help of the third constant voltage $V_C$ and the fifth $R_{T1}$ and sixth $R_{T2}$ resistances, it is secured that the input signal is around the third constant voltage $V_C$ which is adjusted to the transient protection 27. It is thereby achieved that the transient protection 27 only limits the voltage if non-normal voltages occur. Through the third constant voltage $V_C$ and the fifth $R_{T1}$ and sixth $R_{T2}$ resistances, also reflections and other problems are reduced, since a so-called common-mode termination is achieved which means that signals which are common to the two conductors are terminated.

Figure 5:
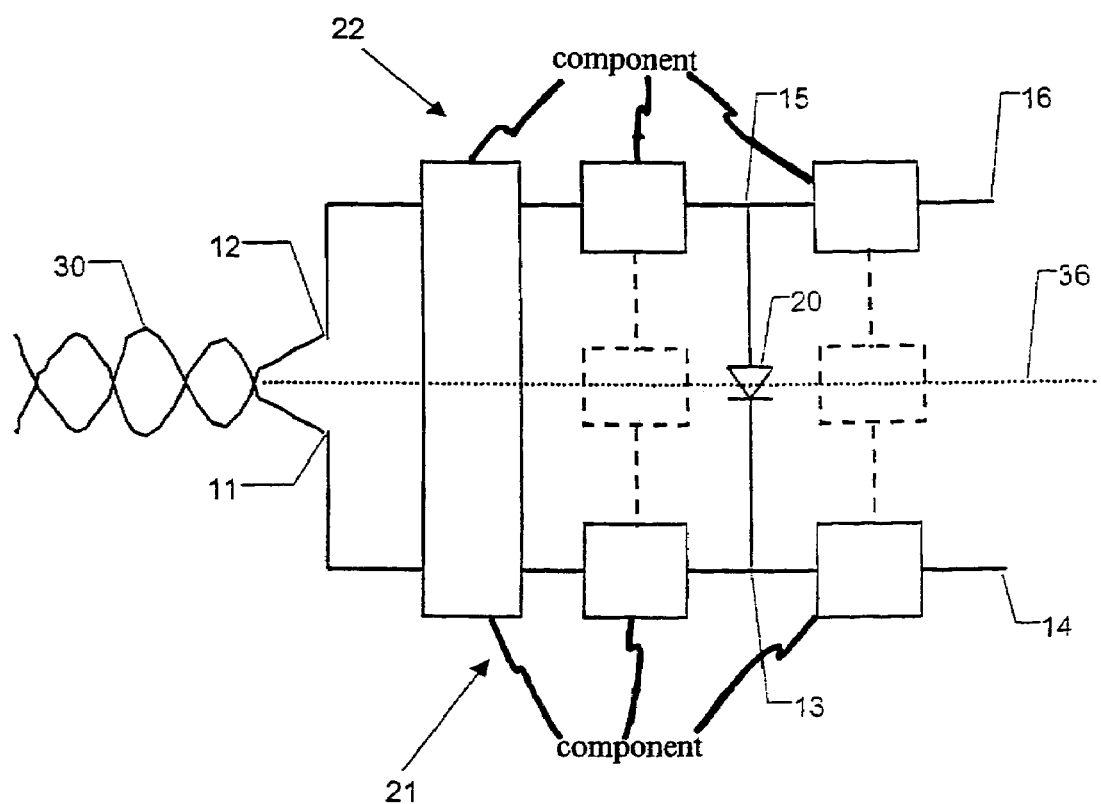
FIG. 5 shows the principle of preferred embodiments of the invention.

FIG. 5 shows the principle of the invention. As is indicated with hatched lines in FIG. 5, the transmitter circuit may comprise further cross-connections between the first circuit branch 21 and the second circuit branch 22. It is even possible that the transmitter circuit comprises active components. However, preferably passive components are used. Concerning the components which are important for the normal operation of the transmitter circuit, it is preferably the case that these components are arranged such that the transmitter circuit is formed mirror-symmetrical along a symmetry line 36 which passes through the middle of possible cross-connections. Thereby, the above described advantages of the invention are achieved in a simple manner. Certain particular components, such as transient protection, which do not have any influence on the normal operation, do not necessarily have to be arranged with the mirrored symmetry. It should also be noted that the transmitter circuit may comprise further components. For example, the transmitter circuit may be arranged with a low-pass filter for preventing high frequency signals from reaching the light source.

The invention has several advantages, such as has already been described above. The input signal does thus not have to be converted into an unbalanced signal. This means i.a. that the voltages at the points 13 and 15 will be in opposite phases, which means that disturbances which could reach other components will be small, since such disturbances from the points 13 and 15 tend to cancel each other.

A transmitter circuit according to the invention may suitably form part of a device which is arranged in a home or at a working place in order to convert electric signals, for example from a computer, to optical signals which are transmitted via an optical fibre. Such a device may advantageously be arranged in or in connection to a wall in a room. The transmitter circuit according to the invention may also form part of a centrally positioned device which transmits optical signals to one or more optical fibres in order to transfer these optical signals to a home or to another place.

The invention is not limited to the shown embodiments but may be varied within the scope of the following claims.

The invention claimed is:

1. A transmitter circuit comprising a light source (20) and arranged to operate said light source (20) to transmit optical communication signals in response to electric input signals from a first (11) and a second (12) circuit point between which circuit points a balanced electric input signal is intended to be present, wherein said transmitter circuit comprises a first circuit branch (21) which extends from said first point (11) via a third point (13) to at least a fourth point (14) and wherein said transmitter circuit comprises a second circuit branch (22) which extends from said second point (12) via a fifth point (15) to at least a sixth point (16), wherein said light source (20) is connected between said third (13) and fifth (15) points, wherein the components which are positioned on said first (21) and second (22) circuit branches are chosen such that the transmitter circuit is formed with a symmetry which is such that under normal operation conditions a balanced drive voltage is the case between said third (13) and fifth (15) points, which balanced drive voltage only depends on the voltage difference between said first (11) and second (12) points, wherein also the modulation current though the light source (2) only depends on said voltage difference.

2. A transmitter circuit according to claim 1, wherein said first (21) and second (22) circuit branches are formed with a mirrored symmetry, such that the electric properties of the components which are arranged on said first circuit branch (21) correspond to the same electric properties of the components which are arranged on said second circuit branch (22).

3. A transmitter circuit according to claim 1, arranged such that a first constant voltage ($V_A$) is the case at said fourth point (14) and a second constant voltage ($V_B$) is the case at said sixth point (16).

4. A transmitter circuit according to claim 3, arranged such that at least one of said first ($V_A$) and second ($V_B$) constant voltages is adjustable.

5. A transmitter circuit according to claim 1, comprising a first capacitor ($C_1$) arranged on said first circuit branch (21) between said first (11) and third (13) points and a second capacitor ($C_2$) arranged on said second circuit branch (22) between said second (12) and fifth (15) points, wherein said first ($C_1$) and second ($C_2$) capacitors have essentially the same value.

6. A transmitter circuit according claim 1, comprising a first resistance ($R_{M1}$) arranged on said first circuit branch (21) between said first (11) and third (13) points and a second resistance ($R_{M2}$) arranged on said second circuit branch (22) between said second (12) and fifth (15) points, wherein said first ($R_{M1}$) and second ($R_{M2}$) resistances have essentially the same value.

7. A transmitter circuit according to claim 6, comprising a third resistance ($R_{B1}$) arranged on said first circuit branch (21) between said third (13) and fourth (14) points and a fourth resistance ($R_{B2}$) arranged on said second circuit branch (22) between said fifth (15) and sixth (16) points, wherein said third ($R_{B1}$) and fourth ($R_{B2}$) resistances have essentially the same value.

8. A transmitter circuit accordint to claim 7, comprising a third circuit branch (23) whict extends between a point (17) on said first circuit branch (12) and the corresponding point (18) on said second circuit branch (22), wherein the third circuit branch (23) comprises at least a fifth resistance ($R_T$) which is arranged to function as a termination resistance.

9. A transmitter circuit accordint to claim 8, wherein said third circuit branch (23) comprises a fifth ($R_{T1}$) and sixth ($R_{T2}$) resistance which have essentially the same value and which are arranged to together function as a termination resistance, wherein the transmitter circuit is arranged such that a third constant voltage ($V_C$) is the case between the fifth ($R_{T1}$) and sixth ($R_{T2}$) resistances on said third circuit branch (23).

10. A transmitter circuit according to any one of claims 5 and 9, comprising a third capacitor ($C_3$) arranged on said first circuit branch (21) between said first point (11) and said first capacitor ($C_1$) and a fourth capacitor ($C_4$) which has essentially the same value as the third capacitor ($C_3$) and which is arranged on said second circuit branch (22) between said second point (12) and said second capacitor ($C_2$), wherein, said third circuit branch (23) extends between a point (17) on said first circuit branch (12) positioned between said first ($C_1$) and third ($C_3$) capacitors and a point (18) on said second circuit branch (22) positioned between said second ($C_2$) and fourth ($C_4$) capacitors.

11. A transmitter circuit according to claim 1, wherein all the components which are arranged on said first (21) and second (22) circuit branches are passive components.

12. A transmitter circuit according to claim 1, comprising transient protection (27) connected to said first (21) and second (22) circuit branches and arranged to protect the light source (20) against undesired voltage pulses.

13. A communication system comprising at least a pair (30) of electric conductors (31, 32) arranged to conduct a balanced electric signal, an optical conductor (35) arranged to conduct said signal in optical form, a transmitter circuit according to claim 1, and a receiver unit, wherein said pair of electric conductors (31, 32) are connected to said first (11) and second (12) points, said optical conductor (35) is arranged to receive and to conduct on light from said light source (20) and said receiver unit is arranged to receive said light from the optical conductor (35).

* * * * *